United States Patent [19]
Sherman

[11] 3,770,036
[45] Nov. 6, 1973

[54] FASTENER

[75] Inventor: Russell G. Sherman, Santa Monica, Calif.

[73] Assignee: The Lamson & Sessions Co., Cleveland, Ohio

[22] Filed: Jan. 31, 1972

[21] Appl. No.: 221,931

[52] U.S. Cl.............. 151/41.7, 85/8.8, 151/41.75, 151/69
[51] Int. Cl............................................. F16b 39/34
[58] Field of Search................. 151/69, 7, 14.5, 151/41.7, 41.75; 85/8.8

[56] References Cited
UNITED STATES PATENTS

| | | | |
|---|---|---|---|
| 3,638,980 | 2/1972 | Kleinhenn | 151/69 |
| 3,503,431 | 3/1970 | Villo et al. | 151/69 |
| 2,398,838 | 4/1946 | Miller et al. | 151/70 |
| 2,533,894 | 12/1950 | Podell | 151/7 |

FOREIGN PATENTS OR APPLICATIONS

| | | | |
|---|---|---|---|
| 1,454,288 | 9/1966 | France | 151/69 |

Primary Examiner—Edward C. Allen
Attorney—J. Herman Yount, Jr. et al.

[57] ABSTRACT

An improved fastener includes a shank having a retaining ring of nylon or other polymeric material. As the fastener is inserted into the hole in the receiving member, the leading surface of a bulge formed by the retaining ring is pressed radially and axially inwardly to compress the retaining ring with a camming action. To prevent the retaining ring from being rolled or otherwise forced out of a groove in the shank under the influence of camming forces, the retaining ring has a non-circular cross sectional configuration with an axial dimension which is greater than the extent to which the retaining ring bulges outwardly of the shank. In addition, the retaining ring is bonded to an inner surface of the shank groove.

4 Claims, 5 Drawing Figures

PATENTED NOV 6 1973 3,770,036

FASTENER

This invention relates generally to a new and improved fastener and, more particularly, to a fastener having a retaining ring which holds the fastener against movement relative to a receiving member.

It is often necessary to position a bolt or other type of fastener in a hole in a receiving member with the head of the bolt downwardly. Therefore, prior to connection of a nut on the threaded end of the bolt, the loose bolt will tend to fall out of the hole in the receiving member. During certain assembly conditions, such as when there is limited access to the bolt, it is desirable to be able to retain the bolt against rotation in the hole in a manner other than by manually holding the bolt.

Accordingly, it is an object of this invention to provide a new and improved fastener having means for retaining the fastener against falling out of a hole in a receiving member after initial insertion of the fastener in the member.

Another object of this invention is to provide a new and improved fastener having a shank with a polymeric retaining ring which frictionally engages a sidewall of a hole to yieldably retain the fastener against movement relative to the hole.

Another object of this invention is to provide a new and improved fastener having a shank with a groove in which a retaining ring is disposed, and wherein the retaining ring extends longitudinally along the shank of the fastener for a distance which is at least twice as great as the extent to which the retaining ring bulges outwardly from the shank of the fastener to retard movement of the retaining ring out of the groove in the shank as it is inserted into a receiving member.

Another object of this invention is to provide a new and improved fastener as set forth in the next preceding object and wherein the retaining ring is bonded to an inner surface of the groove in the fastener shank.

These and other objects and features of the invention will become more apparent upon a consideration of the following description taken in connection with the accompanying drawings wherein.

Figure 4:
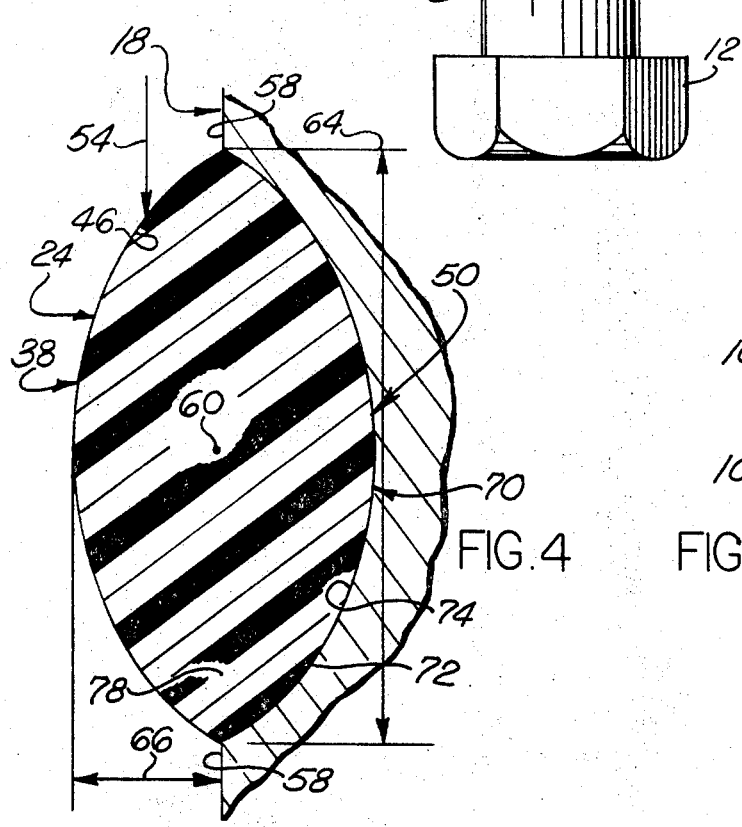
Figure 5:
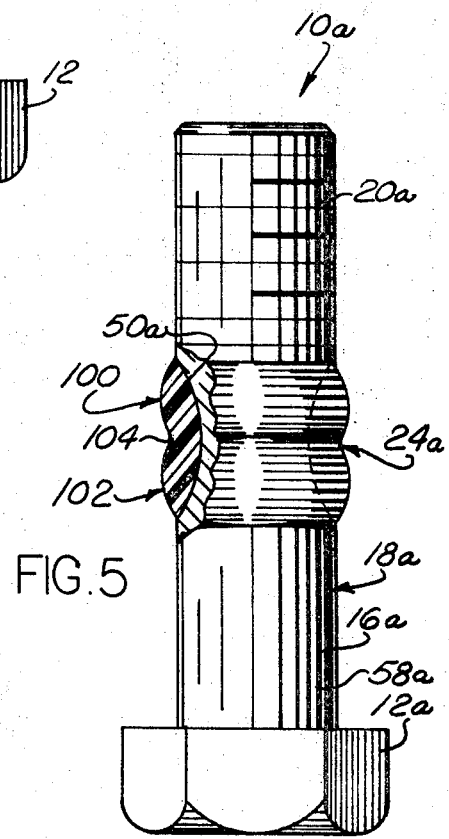

FIG. 4 is an enlarged fragmentary illustration taken on an axial plane extending radially outwardly from the center of the bolt and depicting the relationship between the retaining ring and an annular groove in the shank of the bolt; and FIG. 5 is an elevational view of another embodiment of the invention wherein the retaining ring is provided with a pair of waves which engage the surface of a hole in a receiving member.

A bolt or fastener 10 constructed in accordance with the present invention has a head 12 from which a longitudinally extending metal body 16 projects. In accordance with common practice, the metal body 16 includes a cylindrical shank 18 and a threaded outer end portion 20. In accordance with a feature of the present invention, a polymeric retaining ring 24 provides an annular bulge on the shank 18 to frictionally engage the sidewall of a hole in a cooperating member to retain the bolt in the member.

Figure 2:
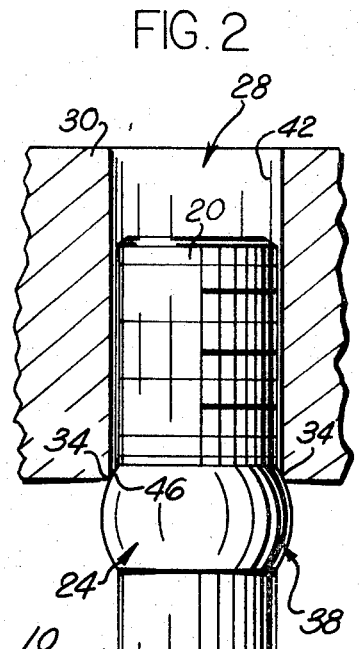
FIG. 2 is an elevational view, similar to FIG. 1, illustrating the relationship between the retaining ring and an outer edge portion of a hole in a receiving member as the bolt is inserted into the hole.

When the bolt 10 is to be inserted in a cylindrical hole 28 (see FIG. 2) in a receiving member 30, the threaded end portion 20 of the bolt enters the hole until a circular outer edge portion 34 of the receiving member 30 engages the outwardly bulging retaining ring 24. Continued axial movement of the bolt 10 into the hole 28 results in the retaining ring 24 being pressed axially toward the head 12 of the bolt and radially inwardly toward the longitudinal axis of the shank 16. Due to a camming action between the circular edge portion 34 of the hole 28 and a sloping annular outer surface 38 of the retaining ring 24, the resilient material of the retaining ring is compressed radially inwardly. Still further movement of the bolt into the hole 28 results in secure frictional engagement between the retaining ring 28 and a sidewall 42 of the hole 28. This frictional engagement between the retaining ring 24 and sidewall of the hole 28 prevents the bolt from falling axially downwardly out of the hole under the influence of gravity or other forces.

To enable the retaining ring 24 to hold the bolt in the hole 28 under the influence of frictional engagement between the outer surface 38 of the retaining ring and the wall 42 of the hole, it is necessary for the retaining ring to be radially compressed as the bolt 10 is moved axially into the hole 28. This results in the application of longitudinally or axially directed forces against a circular leading surface portion 46 (See FIGS. 2 and 4) of the annular retaining ring 24. These axially directed forces tend to cause the retaining ring 24 to roll or move out of an annular groove 50 in the shank 18 toward the head 12 of the bolt 10. In addition, these axially directed forces apply a torque tending to effect rotational movement to the retaining ring 24. Thus, the edge portion 34 of the receiving member 30 applies an axially or longitudinally directed force 54 (see FIG. 4) against the radially outwardly and rearwardly sloping leading surface portion 46 of the retaining ring 24.

Figure 3:
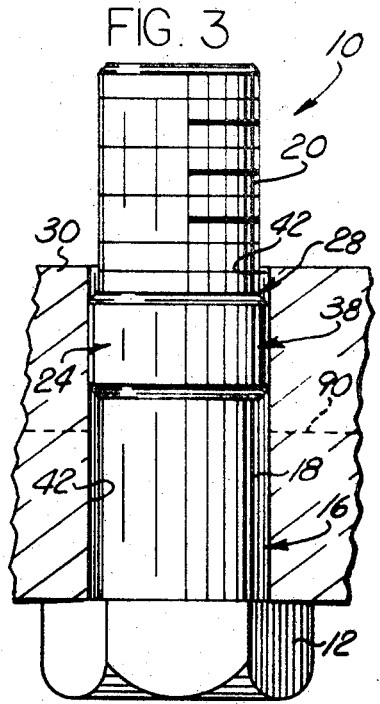
FIG. 3 is an elevational view illustrating the frictional engagement of the retaining ring with a sidewall of the hole in retaining member of FIG. 2.

The force 54 is uniformly applied about the circumference of the retaining ring 24 and tends to cause it to slide axially along the shank 18 toward the head 12 of the bolt 10. In addition, the force 54 is applied to the retaining ring 24 at a location which is radially outwardly from a cylindrical outer surface 58 of the shank 18 and therefore tends to cause the retaining ring 24 to rotate in a counterclockwise direction (as viewed in FIG. 4) about a circular axis 60 extending around the shank 18 of the bolt 10. Of course, if the retaining ring 24 does rotate about the axis 60, the retaining ring will tend to roll along the shank 18 and move out of the groove 50 toward the head 12 of the bolt 10. If this occurs, the retaining ring 24 will not be compressed in the manner illustrated in FIG. 3 to frictionally grip the sidewall 42 of the hole 28.

To prevent the retaining ring 24 from moving axially out of the groove 50 as the bolt 10 is inserted into the hole 28, the retaining ring has an axial extent along the shank of the bolt, that is the distance indicated as 64 in FIG. 4, which is more than twice as great as the distance 66 which the retaining ring bulges outwardly of the cylindrical shank surface 58. In addition, the retaining ring is advantageously formed of nylon which is molded in the groove 58 to form a firm bond at the junction 70 where the inner surface 72 of the groove 50 is disposed in abutting engagement with the annular inner surface 74 of the retaining ring 24. By experimentation, it has been determined that if a commercially available O-ring is utilized with a correspondingly shaped groove, the circular cross sectional configuration of the O-ring will cause it to roll and move axially out of the groove under the influence of the forces applied against the O-ring by the edge portion 34 of the receiving member 30. The combination of the uniform noncircular cross sectional configuration of the retaining ring 24 and the bonding of the retaining ring to the surface 72 of the groove 50 results in the retaining ring 24 being held against axial movement relative to the shank 18 of the bolt 10 under the influence of forces which would be sufficient to move an O-ring out of a groove in the shank.

The precise manner in which the configuration of the retaining ring 24 results in a stabilizing of the retaining ring in the groove 50 is not understood for certain at the present time. However, it is believed that the relatively long axial length, that is the distance 64, of the retaining ring 24 causes it to interact with the shank 18 along the surface of the groove 50 to hold the retaining ring against rotation about its circular axis 60. It is theorized that this retaining effect results from downward pressure of a trailing end portion 78 of the retaining ring 24 against the surface 70 of the groove 50. If the retaining ring 24 had a circular cross sectional configuration or a configuration in which the longitudinal extent of the retaining ring along the shank 18 is equal to the diametral thickness of the ring, that is the distance from the bottom of the groove 50 to the outer surface of the ring, the ring would be relatively free to rotate about the axis 60 and roll out of the groove 50.

To further retard movement of the retaining ring 24 out of the groove 50, the leading surface portion 46 of the retaining ring 24 slopes radially outwardly and rearwardly at an acute angle relative to the cylindrical surface 58 of the shank 18. Therefore, when the leading portion 46 of the annular surface 38 engages the edge portion 34 in the receiving member 30 (see FIG. 2) the force 54 tends to cam or press the retaining ring 24 inwardly. It should be noted that the outer surface 38 of the retaining ring 24 has a uniform circumferential configuration and is disposed in a coaxial relationship with the cylindrical shank 18 so that the force 54 is applied uniformly about the ring.

To promote a camming action between the retaining ring 24 and the edge portion 34 of the member 30 as the bolt is forced into the hole 28, the arcuate outer surface 38 of the retaining ring 24 is formed by a radius which is disposed inwardly of the bottom surface 72 of the groove 50. Since the arcuate outer surface 38 flares radially outwardly in a direction toward the head 12 of the bolt 10, a camming action results when the bolt is formed into the hole 28. In a specific preferred embodiment of the invention, the surface 38 is generated by rotating an arc of a circle having its center disposed on the longitudinal axis of the shank 18 about the axis of the shank. The camming action is also promoted by forming the retaining ring 24 of a polymeric material, such as nylon or similar plastic material rather than natural or synthetic rubber having a relatively high coefficient of friction.

To further insure that the retaining ring 24 remains in a groove 50 as the bolt 10 is inserted into the hole 28, the inner surface 74 of the retaining ring is bonded to the bottom surface 72 of the groove. To provide for this bonding action, the retaining ring 24 is molded in the groove and solidifies with a firm bond between the plastic of the retaining ring and the bottom surface 72 of the groove 50. However it should be understood that when a relatively large axial force is applied against the retaining ring 24 as it is inserted into the hole 28, it is believed that the bond between the surfaces 72 and 74 will be insufficient to hold the retaining ring 24 in the groove 50 if the retaining ring does not have a longitudinal extent 64 which is substantially greater than the extent 66 to which the retaining ring bulges outwardly of the shank 18.

The groove 50 is advantageously formed with a continuously curving arcuate bottom surface 72 in order to minimize stress concentrations in the shank of the bolt. In addition, the groove 50 is advantageously relatively shallow so that it does not unduly impair the strength of the bolt shank 18. To provide the groove 50 with a continuously curving bottom surface 72 and to enable the groove 50 to be relatively shallow, the bottom surface is generated by rotation, about the longitudinal axis of the shank 18, of an arc of a circle having a radius which is equal to the radius of the circle arc on which the outer surface 38 of the retaining ring 24 lies.

Figure 1:
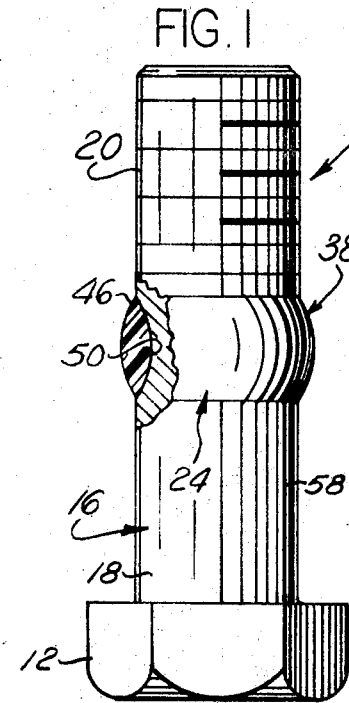
FIG. 1 is an elevational view of a bolt which is constructed in accordance with the present invention and having a retaining ring for frictionally engaging the sidewall of a hole in a receiving member to yieldably retain the bolt against movement relative to the receiving member.

Although the bolt or fastener 10 has been described in association with a receiving member 30 having a thickness which is greater than the axial distance from the head 12 to the retaining ring 24 so that the retaining ring is disposed in the hole 28 of the receiving member, under certain conditions it may be desirable to use the bolt with receiving members which have a thickness which is less than the axial distance between the head 12 and retaining ring 24. Thus, the member 30 could have a relatively small thickness, as indicated by dashed lines at 90 in FIG. 3. When the bolt 10 is used with a relatively thin member, the retaining ring 24 is disposed on the side of the member opposite from the head portion 12. The natural resilience of the retaining ring causes it to bulge outwardly to the condition shown in FIG. 1 so that the retaining ring prevents th bolt 10 from falling out of the hole in the relatively thin member. However, the bolt is free to rotate since the retaining ring 24 does not frictionally engage the side walls of the hole through the relatively thin member. Therefore, the bolt would have to be tightened on to a fixedly held nut by turning the head 12 of the bolt. However, it should be noted that the retaining ring 24 functions to hold the bolt against axial movement relative to the relatively thin member.

It is contemplated that the retaining ring 24 could be provided with an external surface configuration other than the specific surface configuration illustrated in FIGS. 1 through 4. Thus, in the embodiment of the fastener illustrated in FIG. 5 the retaining ring has a plurality of axially extending waves having crests with the configuration of a sine wave. Since the embodiment of the invention illustrated in FIG. 5 is generally similar to the embodiment of the invention illustrated in FIGS. 1 – 4, the same numerals will be utilized to designate the components of the fastener of FIG. 5, the suffix letter "a" being utilized in association with the numerals of FIG. 5 to avoid confusion.

The bolt or fastener 10a has a hexagonal head 12a and axially extending body 16a. The body 16a includes a cylindrical shank 18a and a threaded leading end portion 20a. An annular retaining ring 24a is disposed in an annular groove 50a which extends around the shank 18a and has a central axis which is coaxial with the longitudinal axis of the shank.

The retaining ring 24a is, in accordance with a feature of this embodiment of the invention, provided with a pair of axially extending waves 100 and 102 which are separated by a trough 104. The waves 100 and 102 have crests with a cross sectional configuration, taken along an axially extending plane, which is the same as the cross sectional configuration of the crest of a sine wave. Of course, more than two waves could be provided on the outer surface of the retaining ring 24a if desired.

The retaining ring 24a. like the retaining ring 24 has a longitudinal extent which is more than twice as great as the maximum outward projection at the crests of the waves 100 and 102 in order to stabilize the retaining ring in the groove 50. In addition, the inner surface of the retaining ring 24a is bonded to the bottom surface of the groove 50a.

When the bolt 10a is inserted in a hole in a receiving member, the annular crests on both of the waves 100 and 102 engage the sidewall of the hole to hold the bolt 10a against axial movement relative to the hole. Of course, if desired the outer surface of the retaining ring 24a can be provided with crests having a configuration other than the specific illustrated configuration. In fact, it is contemplated that the outwardly bulging retaining ring 24a can be provided with many different surface configurations as long as the retaining ring has a longitudinal extent along the shank 18a which is more than twice as great as the extent to which the retaining ring bulges outwardly from the outer surface 58a of the shank so that the retaining ring is not pushed or rolled out of the groove 50a as it is inserted in the hole in a receiving member.

In view of the foregoing description, it can be seen that the fastener 10 is adapted to be received in a hole in a cooperating member 30 and retained against movement relative to the member by frictional engagement between the retaining ring 24 and the sidewall 42 of the hole. The retaining ring 24 is formed of a polymeric material and is disposed in an annular groove 50 having a central axis which is coincident with the central axis of the shank 18. To provide for frictional engagement between the retaining ring 24 and inner surface 42 of the hole 28, the retaining ring 24 forms an annular bulge which circumscribes the shank 18 and has a maximum external diameter which is greater than the internal diameter of the hole 28.

To prevent the retaining ring 24 from being forced axially out of the groove 50 as the bolt 10 is moved into the hole 28, the retaining ring is provided with a noncircular cross sectional configuration in an axial plane (as shown in FIG. 4). In addition, the retaining ring 24 extends longitudinally along the shank 18 for a distance which is greater than the extent to which the retaining ring bulges outwardly from the cylindrical outer surface of the shank. To further retain the retaining ring 24 against axial movement along the shank 18, the annular inner surface 74 of the retaining ring is bonded to the annular bottom surface 72 of the groove 50. Although the retaining ring 24 has been described herein in association with a bolt, it is contemplated that it could be used with other types of fasteners.

Having described a specific preferred embodiment of the invention, the following is claimed:

1. A fastener adapted to be received in a hole in a cooperating member and retained against movement relative to the member, said fastener comprising a metal body having a shank with a longitudinally extending outer surface, annular groove means circumscribing said shank and having a central axis which is coincident with a central axis of said shank, said groove means having a continuous annular bottom surface which is disposed radially inwardly of said outer surface of said shank, said bottom surface of said groove means having a continuously curving cross sectional configuration in an axial plane extending radially outwardly from the center of said shank and having an axial extent in the axial plane which is more than twice as great as the maximum depth of said groove means, ring means formed of a polymeric material disposed in said groove means and projecting radially outwardly to form a continuous annular bulge circumscribing said shank and having a maximum diameter which is greater than the inside diameter of the hole in the cooperating member, said ring means having a noncircular cross sectional area in an axial plane extending radially outwardly from the center of said ring means with a portion of said cross sectional area projecting radially outwardly of said outer surface of said shank to form said continuous annular bulge, said bulge having a continuous annular leading surface portion which slopes at an acute angle outwardly from said outer surface of said shank in a direction away from a leading end of the fastener, said annular leading surface having a minimum diameter which is at most slightly less than the inside diameter of the hole in the cooperating member and a maximum diameter which is at least slightly greater than the inside diameter of the hole in the cooperating member to provide for camming engagement between the cooperating member and said annular leading surface of said ring means during movement of said fastener toward the hole in the cooperating member and to facilitate compression of the polymeric material forming said ring means during movement of said fastener into the hole in the cooperating member, said annular leading surface of said ring means having an arcuate cross section configuration with a radius which is greater than the axial extent of said ring means along said shank, said ring means and groove means both extending axially along said shank for a distance which is more than twice as great as the radial distance which said bulge projects outwardly of said outer surface of said shank to retain said ring means in said groove means during camming engagement between said ring means and the cooperating member, and bonding means fixedly interconnecting a radially inner surface of said ring means and said bottom surface of said groove means to further retain said ring means in said groove means during camming engagement between said ring means and cooperating member.

2. A fastener as set forth in claim 1 wherein said annular leading surface has a cross sectional configuration corresponding to a portion of a crest of a sine wave.

3. A fastener as set forth in claim 1 wherein said bulge has an outer surface forming a plurality of axially extending waves having a pair of crests separated by a trough, said crests and trough having circular cross sections in planes perpendicular to the longitudinal axis of said shank, said crests having a cross sectional configuration in an axial plane which is the same as the cross sectional configuration of a sine wave, said annular leading surface portion being formed by a portion of the surface of one of said crests.

4. A fastener as set forth in claim 1 wherein said bulge has an annular trailing surface portion which slopes at an acute angle inwardly toward said outer surface of said shank in a direction away from a leading end of said fastener.

* * * * *